US006404262B1

(12) United States Patent
Nagaraj et al.

(10) Patent No.: US 6,404,262 B1
(45) Date of Patent: Jun. 11, 2002

(54) SWITCHED CAPACITOR INTEGRATOR USING UNITY GAIN BUFFERS

(75) Inventors: Krishnaswamy Nagaraj, Somerville, NJ (US); T. R. Viswanathan, Addison, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/715,661

(22) Filed: Nov. 17, 2000

Related U.S. Application Data

(60) Provisional application No. 60/173,162, filed on Dec. 27, 1999.

(51) Int. Cl.[7] .................................................. G06F 7/64

(52) U.S. Cl. ........................... 327/336; 327/95; 327/94; 327/554

(58) Field of Search ............................... 327/91, 93–95, 327/97, 337, 336, 341, 345, 554

(56) References Cited

U.S. PATENT DOCUMENTS

| | | | | |
|---|---|---|---|---|
| 4,156,923 A | * | 5/1979 | Lampe et al. | 327/91 |
| 4,752,741 A | * | 6/1988 | Kim et al. | 327/337 |
| 5,699,006 A | * | 12/1997 | Zele et al. | 327/341 |
| 5,920,209 A | * | 7/1999 | Kusumoto et al. | 327/91 |
| 6,064,239 A | * | 5/2000 | Matsuoka | 327/91 |
| 6,069,500 A | * | 5/2000 | Kao | 327/337 |

OTHER PUBLICATIONS

M.S. Ghausi, "Electronic Device and Circuits: Discrete and Integrated" University of California at Davis, pp. 405–408, 429–435, 1985.

* cited by examiner

*Primary Examiner*—Terry D. Cunningham
*Assistant Examiner*—Long Nguyen
(74) *Attorney, Agent, or Firm*—J. Dennis Moore; W. James Brady, III; Frederick J. Telecky, Jr.

(57) ABSTRACT

An exemplary electronic circuit of the present include first and second buffers 34 and 38, which are preferably unity gain buffers. A first switch 36 (e.g., a NMOS transistor or a CMOS transmission gate) is coupled between the output of the first buffer 34 and the first terminal of a capacitor 40. The input of the second buffer 38 is also coupled to the first terminal of the capacitor 40. A second switch 42 is coupled between the second terminal of the capacitor 40 and a first voltage node $V_a$ and a third switch 44 is coupled between the second terminal of the capacitor 40 and a second voltage node $V_b$. This circuit can be used as an integrator in a number of applications.

13 Claims, 2 Drawing Sheets

SWITCHED CAPACITOR INTEGRATOR USING UNITY GAIN BUFFERS

This application claims priority under 35 U.S.C. §119(e) (1) of provisional application No. 60/173,162 filed Dec. 27, 1999.

FIELD OF THE INVENTION

The present invention relates generally to electronic devices and more particularly to a switched capacitor integrator using unity gain buffers.

BACKGROUND OF THE INVENTION

Switched-capacitor (S-C) analog sampled-data techniques are widely used in CMOS integrated filters, analog-to-digital and digital-to-analog converters. The use of a capacitor in series with a switch to sample a voltage and accumulate charge to perform integration is rudimentary to this technology.

FIGS. 1*a*–1*c* show examples of a switched capacitor, with FIG. 1*a* illustrating a switched capacitor 10 with one switch 12 and FIG. 1*b* showing the same circuit with two switches 14. and 16. FIG. 1*c* illustrates a MOS (metal oxide semiconductor) implementation of the switches 14 and 16. Typically MOS switches 14 and 16 are controlled by two-phase, non-overlapping clocks. For example, one clock signal would be applied to the gate (control terminal) of transistor 14 while a second non-overlapping clock signal is applied to the gate of transistor 16.

The influence of parasitic capacitors in switched capacitor circuits is minimized using operational-amplifiers (opamps). There are well-known circuit topologies for performing amplification and integration. For example, FIG. 2*a* illustrates a switched capacitor integrator and FIG. 2*b* illustrates a timing diagram for a two-phase clock that can be utilized with the circuit of FIG. 2*a*. In this circuit, opamp 18 is provided with a first input coupled to switch 22 while the second input is grounded. Capacitor 24 is coupled between switch 20 and switch 22. Switches 26 and 28 are also provided to reset the capacitor before applying input voltage $V_{in}$. Capacitor 20 is coupled between the first (negative) input and the output of opamp 18.

During the first phase of the clock, switches 26 and 28 are closed so that both plates of the capacitor are grounded (or discharged). Alternatively, other voltages besides ground could be used. During the second phase of the clock, switches 26 and 28 are opened and switches 20 and 24 are closed. This causes the input voltage $V_{in}$ be transfer across capacitor 24 and be added to the output voltage at node $V_{out}$. Operational amplifier realization, however, becomes very difficult as circuit design moves up in the frequency domain.

SUMMARY OF THE INVENTION

In one aspect, the present invention provides an alternative to the use of operational amplifiers in switched capacitor applications. For example, the preferred embodiment of the present invention utilizes unity gain buffers to implement a switched capacitor integrator. It is relatively easier to achieve unity-gain buffers such as source followers at high frequencies.

In the preferred embodiment, the present invention presents a circuit that employs unity-gain buffers instead of operational amplifiers to perform integration of an input signal. This is achieved by adding sampled values of input voltage in series to obtain the sum. Both recursive and non-recursive integrator architectures are presented. Assuming unity-gain for the buffer, the operation of integration is accurate. While the influence of linear parasitic capacitance in the circuit introduces a gain-factor (e.g., $\alpha<1$), this does not cause a major problem in many applications like sigma-delta converters.

As an example, an electronic circuit of the present would include first and second buffers, preferably unity gain buffers. A first switch (e.g., a NMOS transistor or a CMOS transmission gate) is coupled between the output of the first buffer and the first terminal of a capacitor. This input of the second buffer is also coupled to the first terminal of the capacitor. A second switch is coupled between the second terminal of the capacitor and a first voltage node and a third switch is coupled between the second terminal of the capacitor and a second voltage node. This circuit can be used as an integrator in a number of applications.

The present invention has a number of advantages over prior art implementations, especially those that use operational amplifiers. For example, the preferred circuit implementations are well suited form low power applications. For example, the source follower configuration of a unity gain buffer provides a lower power implementation than operational amplifiers. These circuits will also be able to operate at higher frequencies.

In addition, unity gain buffers are easier to design than operational amplifiers. This fact will become especially significant as operational voltages drop to 1.5 volts to 1 volt and lower. Under these circumstances, the type of circuitry necessary to implement the present invention is easier to design than an operational amplifier.

BRIEF DESCRIPTION OF THE DRAWINGS

The above features of the present invention will be more clearly understood from consideration of the following descriptions in connection with accompanying drawings in which.

DETAILED DESCRIPTION OF THE EMBODIMENTS

The making and use of the presently preferred embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

The present invention will be described with reference to exemplary circuits. These circuits provide specific examples of implementations of the present invention.

Figure 1A:
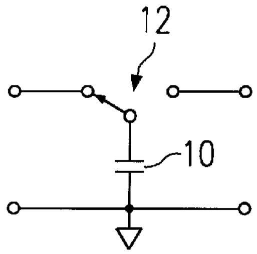
FIG. 1a (PRIOR ART)
FIGS. 1*a*–1*c* show a well known switched capacitor circuit.
Figure 1B:
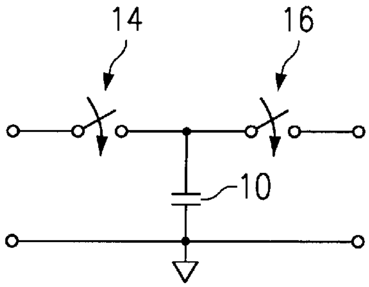
FIG. 1b (PRIOR ART)
Figure 1C:
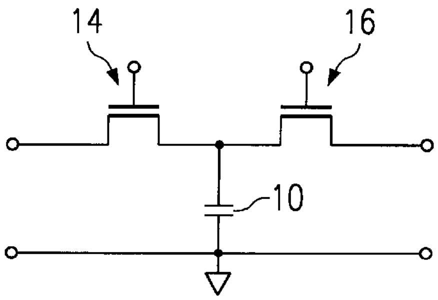
FIG. 1c (PRIOR ART)
Figure 2A:
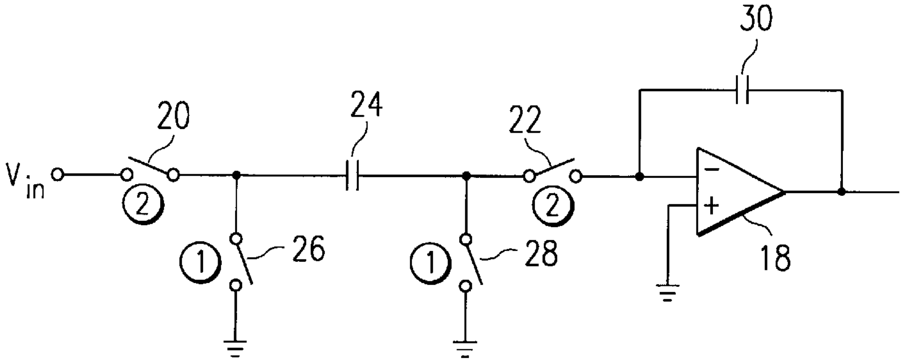
FIG. 2a (PRIOR ART)
FIG. 2*a* show a known operational amplifier implementation of a switched capacitor circuit.
Figure 2B:
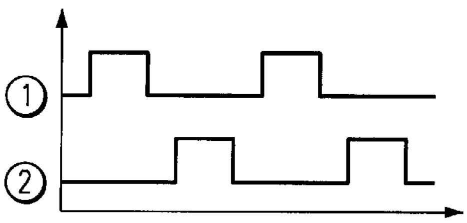
FIG. 2b (PRIOR ART)
FIG. 2*b* shows a timing diagram for a two phase clock used with the circuit of FIG. 2*a;*
Figure 3:
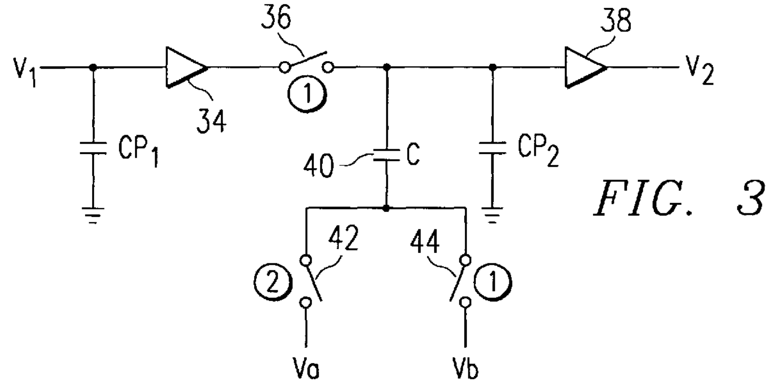
FIG. 3 shows a first preferred embodiment circuit of the present invention.

Consider the circuit shown in FIG. 3. In this circuit, an input voltage $V_1$ is applied to the input of a first buffer 34.

In the preferred embodiment, this buffer 34 is a unity gain buffer implemented, for example, with a source follower configuration. The output of buffer 34 is coupled to switch 36, which has a current path between buffer 34 and the input of buffer 38. As with buffer 34, buffer 38 preferably comprises a unity gain buffer.

The input of buffer 38 is coupled to capacitor 40. The other plate of capacitor 40 coupled to switches 42 and 44. Switch 42 is coupled between the capacitor 40 and voltage node $V_a$ and switch 44 is coupled between the capacitor 40 and voltage node $V_b$. Switches 36, 42 and 44 may comprise any of a number of well known switches such as NMOS transistors, CMOS transmission gates or others.

Figure 4:
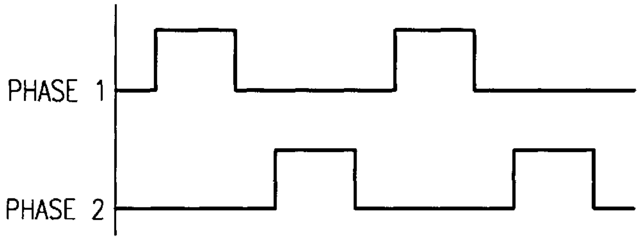
FIG. 4 shows a timing diagram for a two phase clock used with the circuit of FIG. 3.

Here, normally-open switches 36, 42 and 44 close during a clock pulse. The circuit uses a non-overlapping two-phase clock as shown in FIG. 4. The number (1 or 2) provided adjacent to each switch indicates the phase of the clock during which the switch is closed. The capacitors $C_{p1}$ and $C_{p2}$ represent the total parasitic capacitance at the input nodes of the unity-gain buffer 34 and 38, respectively. This capacitance includes the parasitic capacitance associated with the sampling capacitor C, the input capacitance of the buffer 34 or 38 as well as the wiring capacitance.

Figure 5:
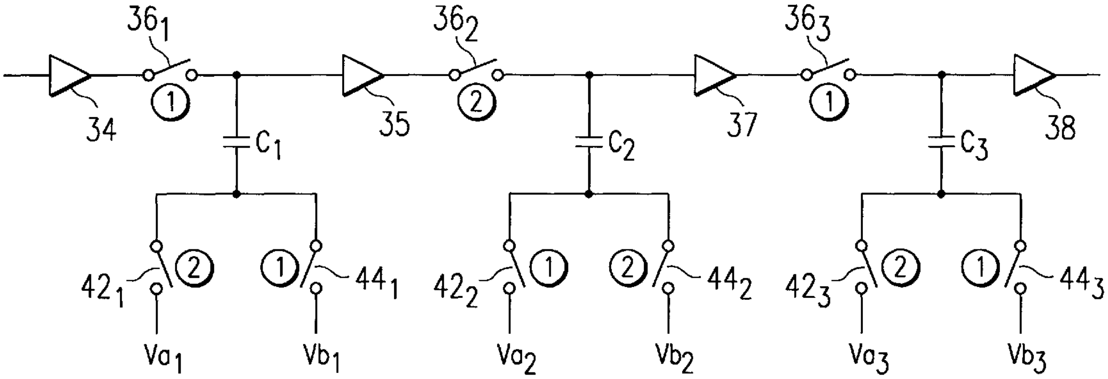
FIG. 5 shows a multi-stage circuit of the present invention.

The input of the buffer 34 is supplied by a voltage source $V_1$. For obtaining a non-recursive (or finite impulse response or FIR type) integrator, this block is repeated in space each containing a set of new inputs ($V_a-V_b$) to be summed. As an example, FIG. 5 shows a three stage pipelined summer. The number of buffers 34, 35, 37, 38 required in a multi-stage integrator will be one more than the number of stages.

Figure 6:
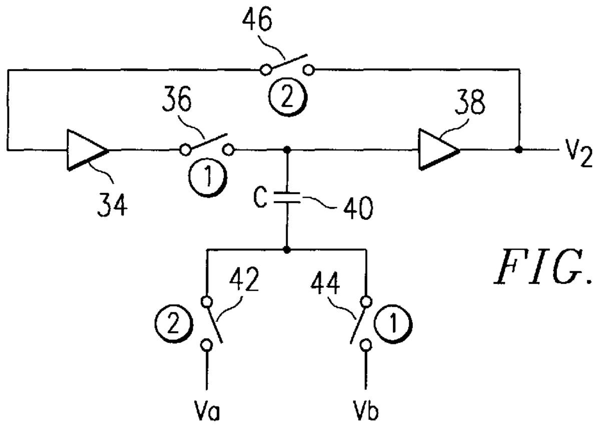
FIG. 6 shows a recursive circuit of the present invention.

FIG. 6 shows an alternative embodiment circuit. This circuit is similar to that of FIG. 3 except that the input of the buffer 34 is supplied by the output of the buffer 38 through switch 46 rather than the input voltage $V_1$. This configuration provides a recursive adder with successive inputs being supplied by the signal input ($V_a-V_b$). A recursive adder might be desirable in embodiments where the number of transistors is to be minimized and where speed can be sacrificed to achieve this goal.

The operation of each of the embodiments will now be explained. In phase I of the clock, capacitor 40 charges to the voltage $V_1-V_b$ through the buffer 34. Simultaneously, parasitic capacitance $C_{p2}$ charges to the voltage $V_1$. In phase 2, the voltage across capacitor 40 adds in series to the voltage $V_a$. But the parasitic capacitor $C_{p2}$ shares some charge. Thus, the net voltage across parasitic capacitor $C_{p2}$, as well as at the input (and output) node of the buffer 38 will be $V_2=V_1+\alpha(Va-Vb)$. The coefficient $\alpha$ will be given by $\alpha=C/(C+C_{p2})$. Note that $\alpha$, though unknown and process dependent, is fixed. This does not pose any problems in systems having automatic gain control (AGC) or where absolute gain is unimportant.

Here an assumption is made that the unity-gain buffers 34 and 38 are ideal. Note that there are no resistive loads on the buffers. Under these circumstances, assuming that the circuit settles completely, it becomes possible to use source-followers to realize these buffers provided they are biased by stiff current-sources and their back-gate bias as well as output conductance effects (e.g., due to channel length modulation) are minimized by special circuit techniques, which are well known in the art. For example, well known techniques such. as feeding forward and cascading provide well known ways to combat short channel effects and/or to provide a stiff current source.

The present invention would be useful in a number of applications. For example, the concepts discussed herein could be utilized in switched capacitor analog sampled-data applications such as CMOS integrated filters, analog-to-digital converters and digital-to-analog converters. These circuits can be implemented without using costly operational amplifiers. As a result, the preferred circuit implementations are well suited form low power applications. For example, the source follower configuration of a unity gain buffer provides a lower power implementation than operational amplifiers. These circuits will also be able to operate at higher frequencies.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A switched capacitor integrator electronic circuit comprising:

a first unity gain buffer having an input and an output;

a capacitor having first and second terminals;

a first switch coupled between the output of the first unity gain buffer and the first terminal of the capacitor;

a second unity gain buffer having an input and an output, the input being coupled to the first terminal of the capacitor;

a second switch coupled between the second terminal of the capacitor and a first voltage node external to said electronic circuit; and a third switch coupled between the second terminal of the capacitor and a second voltage node external to said electronic circuit.

2. The circuit of claim 1 wherein the first switch and the third switch are controlled by a first clock signal, while the second switch is controlled by a second clock signal non-overlapping with the first clock signal.

3. The circuit of claim 1 wherein the second and third switches are controlled by a two phase non-overlapping clock.

4. The circuit of claim 3 wherein the first switch is controlled by the same phase of the clock as the third switch.

5. The circuit of claim 1 and further comprising a fourth switch coupled between the output of the second unity gain buffer and the input of the first unity gain buffer.

6. The circuit of claim 5 wherein the first switch and the third switch are controlled by a first clock signal, while the second switch and the fourth switch are controlled by a second clock signal non-overlapping with the first clock signal.

7. The circuit of claim 1 wherein the first, second and third switches comprise MOS transistors.

8. The circuit of claim 1 wherein the first and second buffers each comprise unity gain buffers.

9. The circuit of claim 8 wherein the first and second buffers each include a source follower.

10. A switched capacitor integrator electronic circuit comprising:

a first unity gain buffer having an input and an output;

a capacitor having first and second terminals;

a first switch with a current path coupled between the output of the first unity gain buffer and the first terminal of the capacitor;

a second unity gain buffer having an input and an output, the input being directly connected to the first terminal of the capacitor;

a second switch with a current path coupled between the second terminal of the capacitor and a first voltage node external to said electronic circuit; and a third switch with a current path coupled between the second terminal of the capacitor and a second voltage node external to said electronic circuit.

11. A method of accumulating voltages, the method comprising:

sampling a first externally applied input voltage and a second externally applied input voltage with a switched capacitor;

adding the sampled voltage to a third voltage by coupling the switched capacitor to a first unity-gain amplifier; and providing a sum value of the sampled differential voltage and the third voltage to a second unity-gain amplifier.

12. The method of claim 11 wherein the third voltage is provided from an output of the second unity-gain amplifier.

13. The method of claim 11 wherein the third voltage is provided from an output of a third unity-gain amplifier.

* * * * *